US00RE43242E

(19) United States
(12) Reissued Patent
Greeff et al.

(10) Patent Number: US RE43,242 E
(45) Date of Reissued Patent: *Mar. 13, 2012

(54) COMMUNICATION SYSTEM, INTERROGATORS AND COMMUNICATION METHODS

(75) Inventors: Roy Greeff, Boise, ID (US); David K. Ovard, Meridian, ID (US)

(73) Assignee: Round Rock Research, LLC, Mt. Kisco, NY (US)

( * ) Notice: This patent is subject to a terminal disclaimer.

(21) Appl. No.: 12/643,948

(22) Filed: Dec. 21, 2009

Related U.S. Patent Documents

Reissue of:

(64) Patent No.: 6,600,905
Issued: Jul. 29, 2003
Appl. No.: 09/757,763
Filed: Jan. 8, 2001

U.S. Applications:

(63) Continuation of application No. 11/193,992, filed on Jul. 29, 2005, which is a continuation of application No. 09/146,764, filed on Sep. 3, 1998, now Pat. No. 6,192,222.

(51) Int. Cl.
*H03C 1/52* (2006.01)
*H04B 5/00* (2006.01)
*H04Q 5/22* (2006.01)

(52) U.S. Cl. ..... 455/106; 455/41.1; 455/41.2; 455/210; 455/108; 340/10.1; 340/10.3; 340/10.4; 340/505

(58) Field of Classification Search ..... 455/41.1, 455/41.2, 85, 106, 210; 340/10.1, 10.3, 10.4; 342/42, 44
See application file for complete search history.

(56) References Cited

U.S. PATENT DOCUMENTS

| | | | | | |
|---|---|---|---|---|---|
| 3,195,073 | A | * | 7/1965 | Penn | 332/170 |
| 3,568,197 | A | * | 3/1971 | Cubley | 342/354 |
| 3,733,602 | A | * | 5/1973 | Cuckler et al. | 342/27 |
| 3,848,191 | A | * | 11/1974 | Anderson | 375/345 |
| 3,914,762 | A | * | 10/1975 | Klensch | 340/5.61 |
| 3,984,835 | A | * | 10/1976 | Kaplan et al. | 342/44 |
| 4,075,632 | A | * | 2/1978 | Baldwin et al. | 342/51 |
| 4,149,121 | A | * | 4/1979 | Gordy et al. | 375/332 |
| 4,364,043 | A | * | 12/1982 | Cole et al. | 340/10.34 |
| 4,544,926 | A | * | 10/1985 | Giuli | 342/19 |
| 4,647,931 | A | * | 3/1987 | Mawhinney | 342/44 |
| 4,725,841 | A | * | 2/1988 | Nysen et al. | 342/44 |
| 4,799,062 | A | * | 1/1989 | Sanderford et al. | 342/450 |
| 4,827,511 | A | * | 5/1989 | Masuko | 380/221 |
| 4,926,182 | A | * | 5/1990 | Ohta et al. | 342/44 |
| 4,968,967 | A | * | 11/1990 | Stove | 342/165 |
| 4,970,519 | A | * | 11/1990 | Minnis et al. | 342/165 |
| 5,134,630 | A | * | 7/1992 | Bateman | 375/142 |
| 5,231,273 | A | * | 7/1993 | Caswell et al. | 235/385 |
| 5,260,707 | A | * | 11/1993 | Goldman | 342/16 |
| 5,305,008 | A | * | 4/1994 | Turner et al. | 342/44 |

(Continued)

*Primary Examiner* — Duc M Nguyen
(74) *Attorney, Agent, or Firm* — Lerner, David, Littenberg, Krumholz & Mentlik, LLP

(57) ABSTRACT

The present invention includes backscatter communication systems, interrogators, methods of communicating in a backscatter system, and backscatter communication methods. According to one aspect of the present invention, a backscatter communication system includes an interrogator including a transmitter configured to output a forward link communication and a receiver configured to receive a return link communication having a carrier signal, the receiver being configured to reduce the amplitude of the carrier signal of the return link communication; and a communication device configured to modulate the carrier signal to communicate the return link communication responsive to reception of the forward link communication.

8 Claims, 9 Drawing Sheets

U.S. PATENT DOCUMENTS 5,345,504 A * 9/1994 West, Jr. ..... 380/205
5,349,355 A * 9/1994 Longas et al. ..... 342/42
5,355,519 A * 10/1994 Hasegawa ..... 455/506
5,365,516 A * 11/1994 Jandrell ..... 370/335
5,369,793 A * 11/1994 Vincent ..... 455/306
5,408,197 A * 4/1995 Miyake ..... 330/129
5,477,215 A * 12/1995 Mandelbaum ..... 340/5.61
5,526,357 A * 6/1996 Jandrell ..... 370/346
5,584,065 A * 12/1996 Monzello ..... 455/296
5,610,940 A * 3/1997 Durrant et al. ..... 375/150
5,617,060 A * 4/1997 Wilson et al. ..... 330/129
5,621,412 A * 4/1997 Sharpe et al. ..... 340/10.33
5,640,151 A * 6/1997 Reis et al. ..... 340/10.2
5,649,296 A * 7/1997 MacLellan et al. ..... 455/39
5,657,317 A * 8/1997 Mahany et al. ..... 370/338
5,691,978 A * 11/1997 Kenworthy ..... 370/278
5,784,686 A * 7/1998 Wu et al. ..... 455/45
5,799,010 A * 8/1998 Lomp et al. ..... 370/335
5,842,118 A * 11/1998 Wood, Jr. ..... 455/101
5,914,671 A * 6/1999 Tuttle ..... 340/10.42
5,920,287 A * 7/1999 Belcher et al. ..... 342/450
5,926,747 A * 7/1999 Komara et al. ..... 455/69
5,940,006 A * 8/1999 MacLellan et al. ..... 370/314
5,952,922 A * 9/1999 Shober ..... 340/572.4
5,970,388 A * 10/1999 Will ..... 455/458
5,983,082 A * 11/1999 Hilbert ..... 455/76
6,046,683 A * 4/2000 Pidwerbetsky et al. ..... 340/10.4
6,058,374 A * 5/2000 Guthrie et al. ..... 705/28
6,064,320 A * 5/2000 d'Hont et al. ..... 340/933
6,084,530 A * 7/2000 Pidwerbetsky et al. ..... 340/10.1
6,107,910 A * 8/2000 Nysen ..... 340/10.1
6,122,329 A * 9/2000 Zai et al. ..... 375/329
6,130,602 A * 10/2000 O'Toole et al. ..... 340/10.33
6,148,048 A * 11/2000 Kerth et al. ..... 375/350
6,150,921 A * 11/2000 Werb et al. ..... 340/10.1
6,192,222 B1 * 2/2001 Greeff et al. ..... 455/106
6,289,209 B1 * 9/2001 Wood, Jr. ..... 455/277.1
6,313,737 B1 * 11/2001 Freeze et al. ..... 340/10.1
6,324,387 B1 * 11/2001 Kamgar et al. ..... 455/234.1
6,353,406 B1 * 3/2002 Lanzl et al. ..... 342/118
6,353,729 B1 * 3/2002 Bassirat ..... 455/11.1
6,356,230 B1 * 3/2002 Greef et al. ..... 342/127
6,356,764 B1 * 3/2002 Ovard et al. ..... 455/456.2
6,456,668 B1 * 9/2002 MacLellan et al. ..... 375/283
6,600,905 B2 * 7/2003 Greeff et al. ..... 455/106
6,603,391 B1 * 8/2003 Greeff et al. ..... 340/10.3
6,721,549 B2 * 4/2004 Lee et al. ..... 455/234.1
6,903,656 B1 * 6/2005 Lee ..... 340/572.1
7,023,341 B2 * 4/2006 Stilp ..... 340/572.1
7,091,828 B2 * 8/2006 Greeff et al. ..... 340/10.3
7,369,811 B2 * 5/2008 Bellantoni ..... 455/41.2
7,592,898 B1 * 9/2009 Ovard et al. ..... 340/10.4
2002/0090958 A1 * 7/2002 Ovard et al. ..... 455/456
2006/0267735 A1 * 11/2006 Ovard et al. ..... 340/10.4
2006/0279407 A1 * 12/2006 Greeff et al. ..... 340/10.1
2007/0290806 A1 * 12/2007 Greeff et al. ..... 340/10.1
2007/0290813 A1 * 12/2007 Ovard et al. ..... 340/10.4
2008/0001754 A1 * 1/2008 Ovard et al. ..... 340/572.1

* cited by examiner

COMMUNICATION SYSTEM, INTERROGATORS AND COMMUNICATION METHODS

Matter enclosed in heavy brackets [ ] appears in the original patent but forms no part of this reissue specification; matter printed in italics indicates the additions made by reissue.

[This patent] *More than one reissue application has been filed for the reissue of U.S. Pat. No. 6,600,905, including the initial reissue application Ser. No. 11/193,992, filed Jul. 29, 2005, and the present continuation reissue application Ser. No. 12/643,948, filed Dec. 21, 2009, which is a continuation application of the initial reissue application Ser. No. 11/193, 992, filed Jul. 29, 2005, which is a reissue application of U.S. Pat. No. 6,600,905* resulted from *U.S. patent application Ser. No. 09/757,763, which is* a continuation application of U.S. patent application Ser. No. 09/146,764, filed Sep. 3, 1998 now U.S. Pat. No. 6,192,222 entitled "Backscatter Communication Systems, Interrogators, Methods of Communicating in a Backscatter System, and Backscatter Communication Methods", naming Roy Greeff and David K. Ovard as inventors, the disclosure of which is incorporated by reference.

TECHNICAL FIELD

The present invention relates to backscatter communication systems, interrogators, methods of communicating in a backscatter system, and backscatter communication methods.

BACKGROUND OF THE INVENTION

Electronic identification systems typically comprise two devices which are configured to communicate with one another. Preferred configurations of the electronic identification systems are operable to provide such communications via a wireless medium.

One such configuration is described in U.S. patent application Ser. No. 08/705,043, filed Aug. 29, 1996, assigned to the assignee of the present application, and incorporated herein by reference. This application discloses the use of a radio frequency (RF) communication system including communication devices. The disclosed communication devices include an interrogator and a remote transponder, such as a tag or card.

Such communication systems can be used in various applications such as identification applications. The interrogator is configured to output a polling or interrogation signal which may comprise a radio frequency signal including a predefined code. The remote transponders of such a communication system are operable to transmit an identification signal responsive to receiving an appropriate polling or interrogation signal.

More specifically, the appropriate transponders are configured to recognize the predefined code. The transponders receiving the code subsequently output a particular identification signal which is associated with the transmitting transponder. Following transmission of the polling signal, the interrogator is configured to receive the identification signals enabling detection of the presence of corresponding transponders.

Such communication systems are useable in identification applications such as inventory or other object monitoring. For example, a remote identification device is attached to an object of interest. Responsive to receiving the appropriate polling signal, the identification device is equipped to output an identification signal. Generating the identification signal identifies the presence or location of the identification device and the article or object attached thereto.

Some conventional electronic identification systems utilize backscatter communication techniques. More specifically, the interrogator outputs a polling signal followed by a continuous wave (CW) signal. The remote communication devices are configured to modulate the continuous wave signal in backscatter communication configurations. This modulation typically includes selective reflection of the continuous wave signal. The reflected continuous wave signal includes the reply message from the remote devices which is demodulated by the interrogator.

Certain drawbacks have been identified with the use of backscatter communication techniques. For example, the transmission of the continuous wave signal using the interrogator can desensitize the receiver of the interrogator during reception thereby of reply signals from associated remote devices. In particular, some of the continuous wave signal tends to bleed through to the received reply messages. Such results in degradation of wireless communications.

There exists a need to provide a system which provides improved wireless communications without the drawbacks associated with conventional devices.

SUMMARY OF THE INVENTION

The present invention includes backscatter communication systems, interrogators, methods of communicating in a backscatter system, and backscatter communication methods.

One aspect of the present invention provides a method of reducing power within a modulated return link continuous wave signal of a coherent backscatter communication system including an interrogator and at least one remote communication device. Exemplary remote communication devices include remote intelligent communication (RIC) devices and radio frequency identification devices (RFID) of electronic identification systems.

The interrogator preferably comprises a coherent interrogator configured to provide backscatter communications. More specifically, the interrogator is configured to output a forward link communication and a wireless continuous wave signal using a transmitter. The interrogator is also configured to output a local continuous wave signal to a receiver of the interrogator following transmission of the forward link communication. Provision of the local signal enables coherent operation of the interrogator. The interrogator is operable to receive return link communications from at least one remote communication device responsive to transmission of the forward link wireless communication.

In some embodiments, the interrogator includes a receiver operable to reduce the amplitude of a carrier signal of the return link communication. For backscatter communications, the remote communication device is configured to modulate the continuous wave signal providing a carrier component and side band components. The receiver of the interrogator is preferably configured to reduce the amplitude of the carrier component while maintaining the amplitudes of the side band components.

A communication method according to one aspect of the present invention provides reduction of the amplitude of the carrier component of the modulated continuous wave signal. This method includes the steps of matching the amplitude of a local continuous wave signal with an amplitude of a modulated continuous wave signal; adjusting the phase of the local continuous wave signal following the matching; and summing the local continuous wave signal and the modulated continuous wave signal following the adjusting. The adjusting the phase preferably comprises searching for a phase adjustment of the local continuous wave signal which provides maximum reduction of the amplitude of the modulated continuous wave signal at the frequency of the wireless continuous wave signal.

BRIEF DESCRIPTION OF THE DRAWINGS

Preferred embodiments of the invention are described below with reference to the following accompanying drawings.

FIG. 4 is a functional block diagram of a transponder included in the remote communication device of FIG. 2.

FIG. 5 is a functional block diagram of an interrogator of the communication system.

FIG. 7 is a functional block diagram of an adaptive canceler of the RF section.

FIG. 10 is a schematic diagram illustrating one configuration of an amplitude detector and a phase adjuster of the adaptive canceler.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
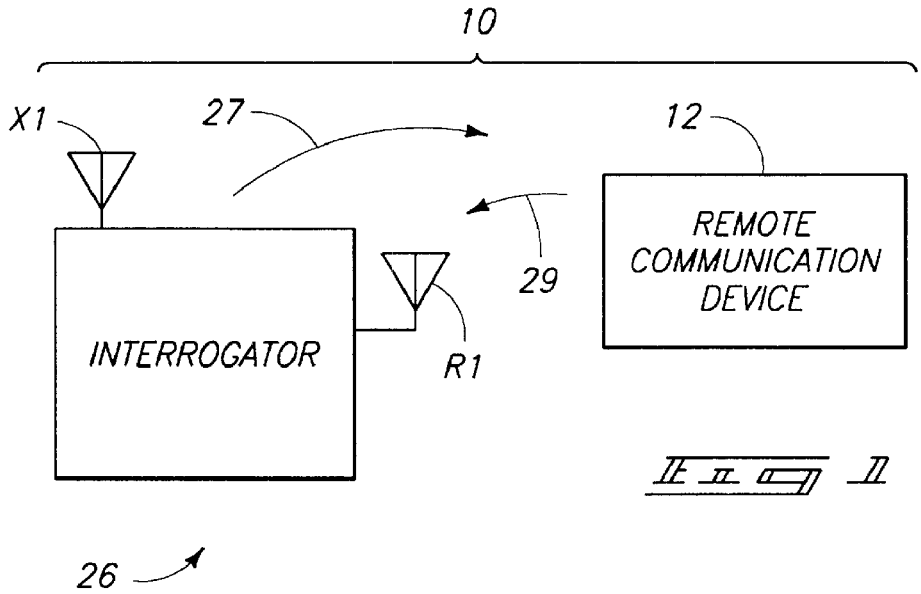
FIG. 1 is a block diagram of an exemplary communication system.

FIG. 1 illustrates a wireless communication system 10 embodying the invention. Communication system 10 comprises an electronic identification system in the embodiment described herein. Further, the described communication system 10 is configured for backscatter communications as described in detail below. Other communication protocols are utilized in other embodiments.

The depicted communication system 10 includes at least one electronic wireless remote communication device 12 and an interrogator 26. Radio frequency communications can occur intermediate remote communication devices 12 and interrogator 26 for use in identification systems and product monitoring systems as exemplary applications.

Devices 12 include radio frequency identification devices (RFID) or remote intelligent communication (RIC) devices in the embodiments described herein. Exemplary devices 12 are disclosed in U.S. patent application Ser. No. 08/705,043, filed Aug. 29, 1996. Plural wireless remote communication devices 12 typically communicate with interrogator 26 although only one such device 12 is illustrated in FIG. 1.

In one embodiment, wireless remote communication device 12 comprises a wireless identification device such as the MicroStamp (™) integrated circuit available from Micron Communications, Inc., 3176 S. Denver Way, Boise, Id. 83705. Such a remote communication device 12 can be referred to as a tag or card as illustrated and described below.

Although multiple communication devices 12 can be employed in communication system 10, there is typically no communication between multiple devices 12. Instead, the multiple communication devices 12 communicate with interrogator 26. Multiple communication devices 12 can be used in the same field of interrogator 26 (i.e., within the communications range of interrogator 26). Similarly, multiple interrogators 26 can be in proximity to one or more of devices 12.

The above described system 10 is advantageous over prior art devices that utilize magnetic field effect systems because, with system 10, a greater range can be achieved, and more information can be obtained (instead of just identification information). As a result, such a system 10 can be used, for example, to monitor large warehouse inventories having many unique products needing individual discrimination to determine the presence of particular items within a large lot of tagged products.

Remote communication device 12 is configured to interface with interrogator 26 using a wireless medium in one embodiment. More specifically, communications intermediate communication device 12 and interrogator 26 occur via an electromagnetic link, such as an RF link (e.g., at microwave frequencies) in the described embodiment. Interrogator 26 is configured to output forward link wireless communications 27. Further, interrogator 26 is operable to receive reply or return link wireless communications 29 from devices 12 responsive to the outputting of forward link communication 27. In accordance with the above, forward link communications and return link communications comprise wireless signals, such as radio frequency signals, in the described embodiment. Other forms of electromagnetic communication, such as infrared, acoustic, etc. are possible.

Interrogator unit 26 includes a plurality of antennas X1, R1, as well as transmitting and receiving circuitry, similar to that implemented in devices 12. Antenna X1 comprises a transmit antenna and antenna R1 comprises a receive antenna individually connected to interrogator 26.

In operation, interrogator 26 transmits the interrogation command or forward link communication signal 27 via antenna X1. Communication device 12 is operable to receive the incoming forward link signal. Upon receiving signal 27, communication device 12 is operable to respond by communicating the responsive reply or return link communication signal 29. Communications of system 10 are described in greater detail below.

In one embodiment, responsive signal 29 is encoded with information that uniquely identifies, or labels the particular device 12 that is transmitting, so as to identify any object, animal, or person with which communication device 12 is associated.

More specifically, remote device 12 is configured to output an identification signal within reply link communication 29 responsive to receiving forward link wireless communication 27. Interrogator 26 is configured to receive and recognize the identification signal within the return or reply link communication 29. The identification signal can be utilized to identify the particular transmitting communication device 12.

Figure 2:
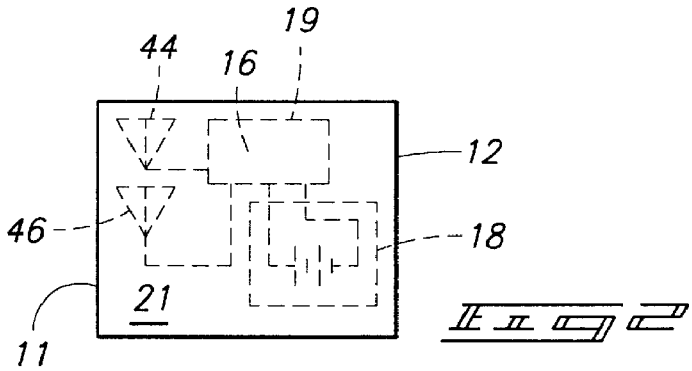
FIG. 2 is a front view of a wireless remote communication device according to one embodiment of the invention.

Referring to FIG. 2, one embodiment of remote communication device 12 is illustrated. The depicted communication device 12 includes a transponder 16 having a receiver and a transmitter as described below. Communication device 12 further includes a power source 18 connected to transponder 16 to supply operational power to transponder 16. In the illustrated embodiment, transponder 16 is in the form of an integrated circuit 19. However, in alternative embodiments, all of the circuitry of transponder 16 is not necessarily all included in integrated circuit 19.

Power source 18 is a thin film battery in the illustrated embodiment, however, in alternative embodiments, other forms of power sources can be employed. If the power source 18 is a battery, the battery can take any suitable form. Preferably, the battery type will be selected depending on weight, size, and life requirements for a particular application. In one embodiment, battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the battery comprises a series connected pair of button type cells.

Communication device 12 further includes at least one antenna connected to transponder 16 for wireless transmission and reception. In the illustrated embodiment, communication device 12 includes at least one receive antenna 44 connected to transponder 16 for radio frequency reception by transponder 16, and at least one transmit antenna 46 connected to transponder 16 for radio frequency transmission by transponder 16. The described receive antenna 44 comprises a loop antenna and the transmit antenna 46 comprises a dipole antenna.

Communication device 12 can be included in any appropriate housing or packaging. FIG. 2 shows but one example of a housing in the form of a miniature housing 11 encasing device 12 to define a tag which can be supported by an object (e.g., hung from an object, affixed to an object, etc.).

Figure 3:
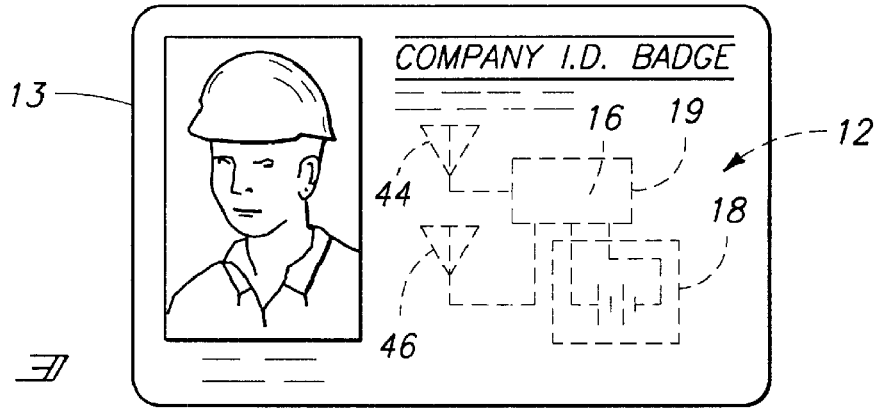
FIG. 3 is a front view of an employee badge according to another embodiment of the invention.
Figure 2:
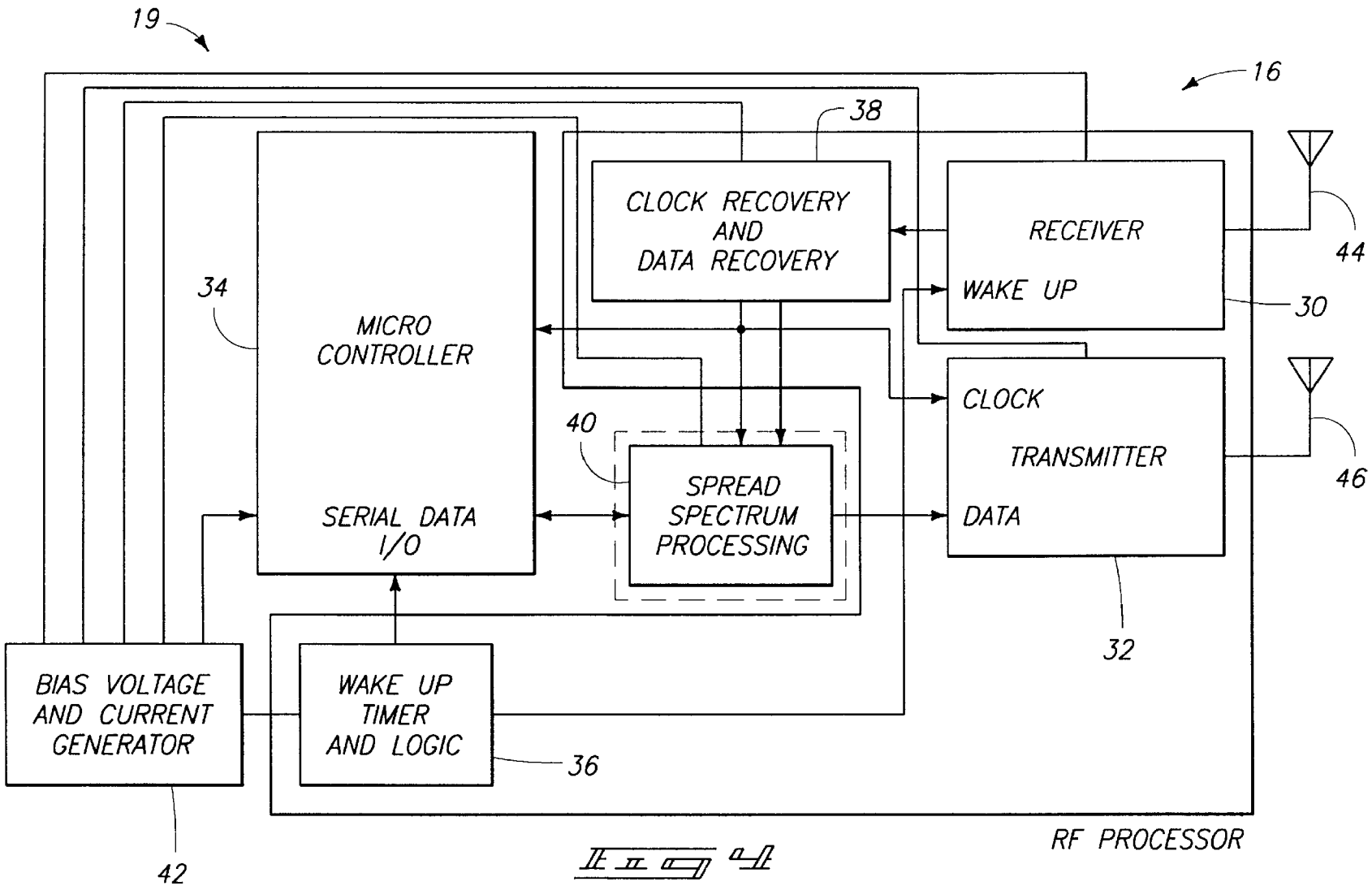
Figure 3:
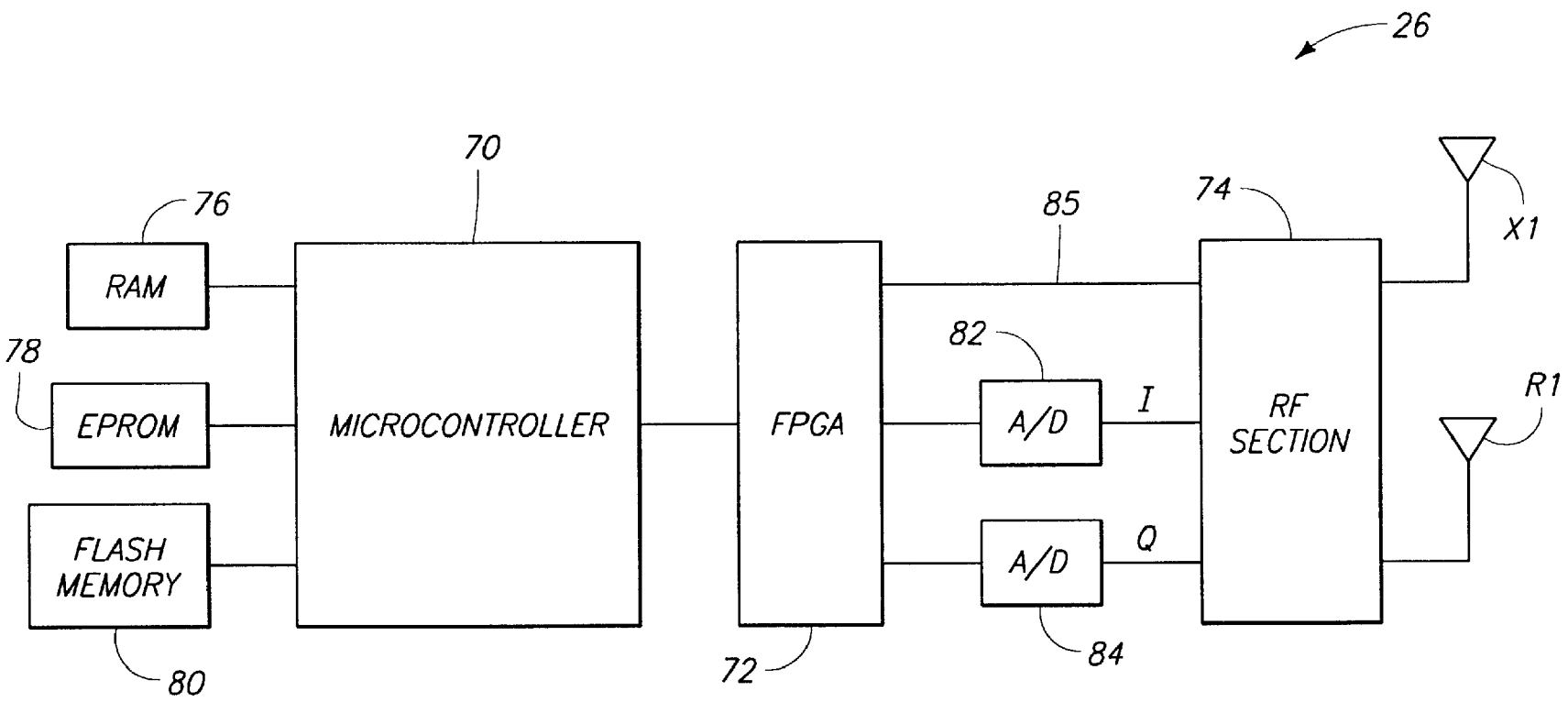

Referring to FIG. 3, an alternative housing is illustrated. FIG. 3 shows a housing in the form of a card 13. Card 13 preferably comprises plastic or other suitable material. Plastic card 13 houses communication device 12 to define an employee identification badge including the communication device 12. In one embodiment, the front face of card 13 has visual identification features such as an employee photograph or a fingerprint in addition to identifying text.

Although two particular types of housings have been disclosed, the communication device 12 can be included in any appropriate housing. Communication device 12 is preferably of a small size that lends itself to applications employing small housings, such as cards, miniature tags, etc. Larger housings can also be employed. The communication device 12, provided in any appropriate housing, can be supported from or attached to an object in any desired manner.

FIG. 4 is a high level circuit schematic of transponder 16 utilized in the devices of FIGS. 1-3. In the embodiment shown in FIG. 4, transponder 16 is implemented within monolithic integrated circuit 19. In the illustrated embodiment, integrated circuit 19 comprises a single die, having a size of $209\times116$ mils$^2$, including a receiver 30, transmitter 32, microcontroller or microprocessor 34, a wake up timer and logic circuit 36, a clock recovery and data recovery circuit 38, and a bias voltage and current generator 42. Integrated circuit 19 preferably comprises a small outline integrated circuit (SOIC) package. Receiver 30 and transmitter 32 comprise wireless communication circuitry configured to communicate wireless signals.

In one embodiment, communication devices 12 switch between a "sleep" mode of operation, and higher power modes to conserve energy and extend battery life during periods of time where no interrogation signal 27 is received by devices 12, using the wake up timer and logic circuitry 36.

In one embodiment, a spread spectrum processing circuit 40 is included in transponder 16. In this embodiment, signals transmitted and received by interrogator 26 and signals transmitted and received by communication device 12 are modulated spread spectrum signals. Many modulation techniques minimize required transmission bandwidth. However, the spread spectrum modulation techniques employed in the illustrated embodiment require a transmission bandwidth that is up to several orders of magnitude greater than the minimum required signal bandwidth. Although spread spectrum modulation techniques are bandwidth inefficient in single user applications, they are advantageous where there are multiple users, as is the case with the preferred radio frequency identification communication system 10 of the present invention.

The spread spectrum modulation technique of the illustrated embodiment is advantageous because the interrogator signal can be distinguished from other signals (e.g., radar, microwave ovens, etc.) operating at the same frequency. The spread spectrum signals transmitted by communication device 12 and interrogator 26 are pseudo random and have noise-like properties when compared with the digital command or reply. The illustrated embodiment employs direct sequence spread spectrum (DSSS) modulation.

In operation, interrogator 26 sends out a command that is spread around a certain center frequency (e.g., 2.44 GHz). After the interrogator transmits the command, and is expecting a response, the interrogator switches to a continuous wave (CW) mode for backscatter communications. In the continuous wave mode, interrogator 26 does not transmit any information. Instead, the interrogator just transmits a radio frequency continuous wave signal. In the described embodiment, the continuous wave signal comprises a radio frequency 2.44 GHz carrier signal. In other words, the continuous wave signal transmitted by interrogator 26 is not modulated. After communication device 12 receives the forward link communication from interrogator 26, communication device 12 processes the command.

If communication device 12 is operating in a backscatter mode, device 12 modulates the continuous wave signal providing a modulated continuous wave signal to communicate return link communication 29 responsive to reception of forward communication signal 27. Communication device 12 may modulate the continuous wave signal according to a subcarrier or modulation signal. Modulation by device 12 comprises selective reflection of the continuous wave signal. In particular, device 12 alternately reflects or does not reflect the continuous wave signal from the interrogator to send its reply. For example, in the illustrated embodiment, two halves of a dipole antenna are either shorted together or isolated from each other to send a reply. Alternatively, communication device 12 can communicate in an active mode.

Figure 11:
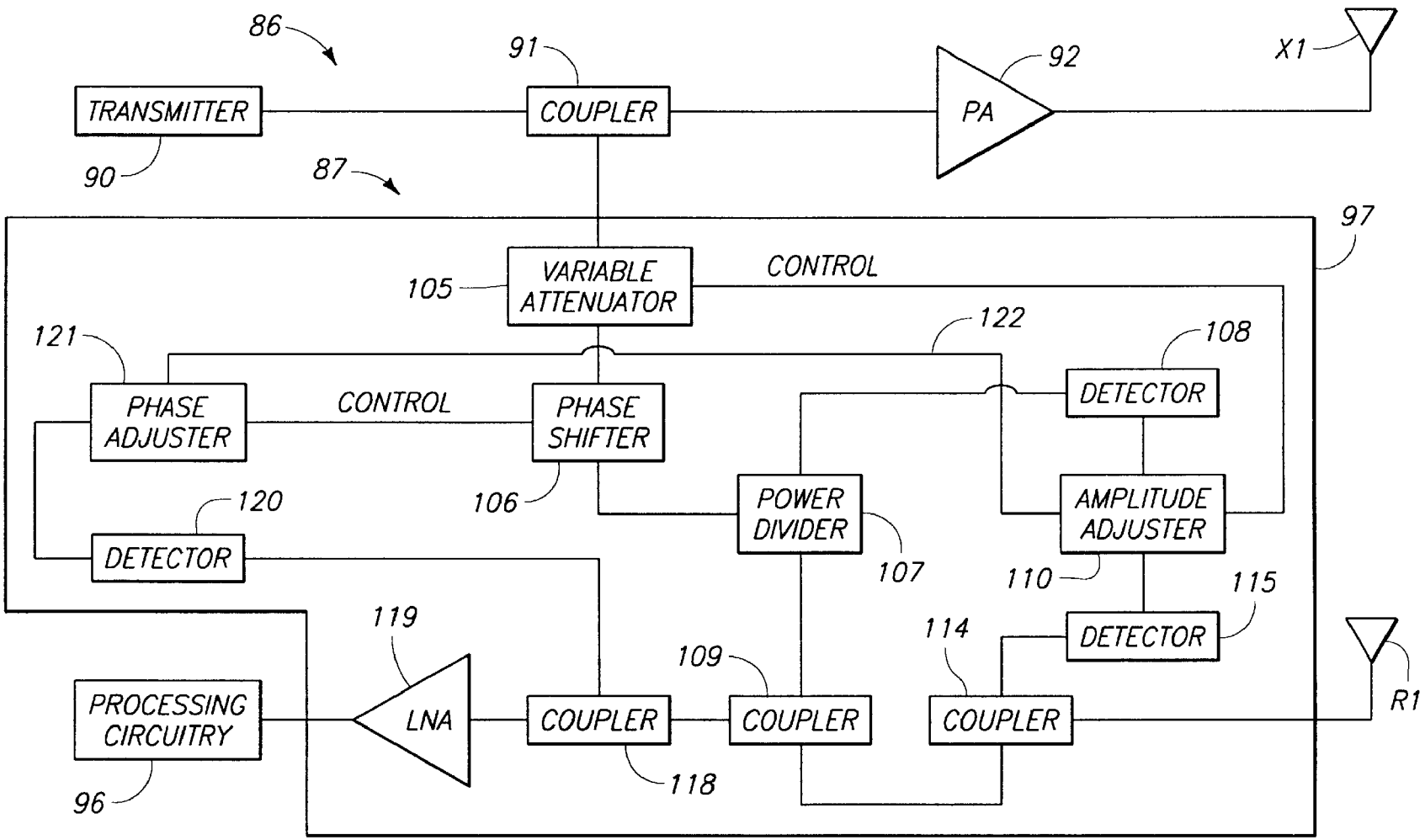
FIG. 11 is a graphical illustration of a received return link communication.
Figure 12:
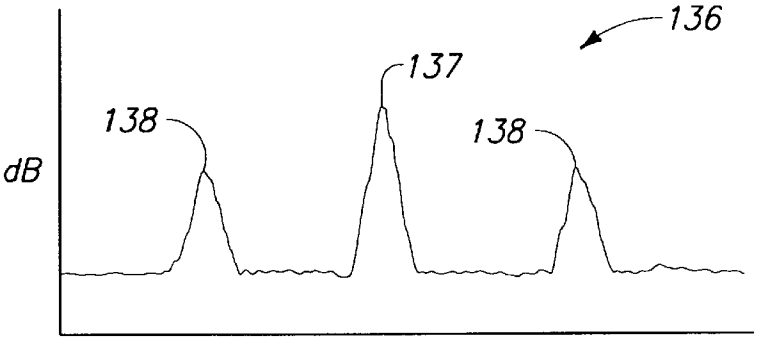
FIG. 12 is a graphical illustration of a summed return link communication.
Figure 11:
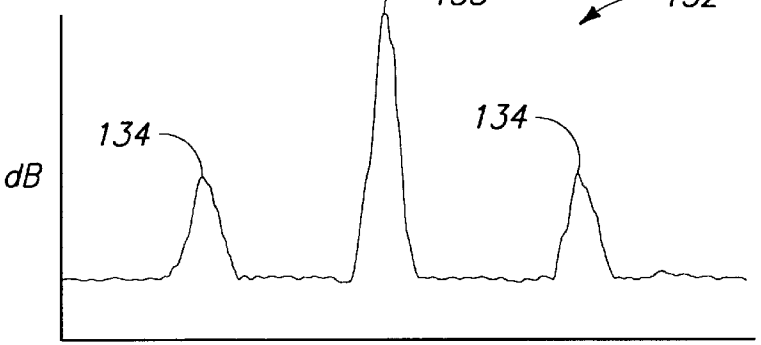

The modulated continuous wave signal communicated from device 12 comprises a carrier component and plural side band components about the carrier component resulting from the modulation. More specifically, the modulated continuous wave signal output from device 12 includes a radio frequency continuous wave signal having a first frequency (2.44 GHz), also referred to as a carrier component, and a subcarrier modulation signal having a different frequency (e.g., 600 kHz) and which provides the side band components. In particular, the side band components are at +/−600 kHz of the carrier component. The carrier and side band components are illustrated in FIG. 11 and FIG. 12.

In one embodiment, the clock for transponder 16 is extracted from the incoming message itself by clock recovery and data recovery circuitry 38. This clock is recovered from the incoming message, and used for timing for microcontroller 34 and all the other clock circuitry on the chip, and also for deriving the transmitter carrier or the subcarrier, depending on whether the transmitter is operating in active mode or backscatter mode.

In addition to recovering a clock, the clock recovery and data recovery circuit 38 also performs data recovery on valid incoming signals. The valid spread spectrum incoming signal is passed through the spread spectrum processing circuit 40, and the spread spectrum processing circuit 40 extracts the actual ones and zeros of data from the incoming signal. More particularly, the spread spectrum processing circuit 40 takes chips from the spread spectrum signal, and reduces individual thirty-one chip sections down to a bit of one or zero, which is passed to microcontroller 34.

Microcontroller 34 includes a serial processor, or I/O facility that receives the bits from spread spectrum processing circuit 40. The microcontroller 34 performs further error correction. More particularly, a modified hamming code is employed, where each eight bits of data is accompanied by five check bits used by the microcontroller 34 for error correction. Microcontroller 34 further includes a memory, and after performing the data correction, microcontroller 34 stores bytes of the data bits in memory. These bytes contain a command sent by the interrogator 26. Microcontroller 34 is configured to respond to the command.

For example, interrogator 26 may send a command requesting that any communication device 12 in the field respond with the device's identification number. Status information can also be returned to interrogator 26 from communication devices 12.

Communications from interrogator 26 (i.e., forward link communications) and devices 12 (i.e., return link communications) have a similar format. Exemplary communications are discussed below with reference to FIG. 13. More particularly, the forward and reply communications individually include a calibration period, preamble, and Barker or start code which are followed by actual data in the described embodiment. The incoming forward link message and outgoing reply preferably also include a check sum or redundancy code so that transponder 16 or interrogator 26 can confirm receipt of the entire message or reply.

Communication devices 12 typically include an identification sequence identifying the particular tag or device 12 sending the reply. Such implements the identification operations of communication system 10.

After sending a command, interrogator 26 sends the unmodulated continuous wave signal. Return link data can be Differential Phase Shift Key (DPSK) modulated onto the continuous wave signal using a square wave subcarrier with a frequency of approximately 600 kHz (e.g., 596.1 kHz in one embodiment). A data 0 corresponds to one phase and data 1 corresponds to another, shifted 180 degrees from the first phase.

The subcarrier or modulation signal is used to modulate antenna impedance of transponder 16 and generate the modulated continuous wave signal. For a simple dipole, a switch between the two halves of the dipole antenna is opened and closed. When the switch is closed, the antenna becomes the electrical equivalent of a single half-wavelength antenna that reflects a portion of the power being transmitted by the interrogator. When the switch is open, the antenna becomes the electrical equivalent of two quarter-wavelength antennas that reflect very little of the power transmitted by the interrogator. In one embodiment, the dipole antenna is a printed microstrip half wavelength dipole antenna.

Referring to FIG. 5, one embodiment of interrogator 26 is illustrated. The depicted interrogator 26 includes a microcontroller 70, a field programmable gate array (FPGA) 72, and RF section 74. In the depicted embodiment, microcontroller 70 comprises a MC68340 microcontroller available from Motorola, Inc. FPGA 72 comprises an XC4028 device available from Xilinx, Inc. Further details of components 70, 72, and 74 are described below.

RAM 76, EPROM 78 and flash memory 80 are coupled with microcontroller 70 in the depicted embodiment. Microcontroller 70 is configured to access an applications program for controlling the interrogator 26 and interpreting responses from devices 12. The processor of microcontroller 70 is configured to control communication operations with remote communication devices 12 during normal modes of operation. The applications program can also include a library of radio frequency identification device applications or functions. These functions effect radio frequency communications between interrogator 26 and communication device 12.

RF section 74 is configured to handle wireless (e.g., radio frequency) communications with remote communication devices 12. DPSK modulation techniques can be utilized for communications intermediate devices 12 and interrogator 26. RF section 74 can include downconversion circuitry for generating in-phase (I) and quadrature (Q) signals which contain the DPSK modulated subcarrier for application to FPGA 72 during return link communications.

Plural antennas, including a transmit antenna X1 and a receive antenna R1 are coupled with RF section 74 for wireless RF communications. Plural RF transmit (TX) ports and RF receive (RX) ports (not shown) are coupled with RF section 74 in a preferred embodiment. Provision of plural TX ports and RX ports enables interrogator 26 to minimize the effects of multipath when communicating with plural remote communication devices 12.

Analog to digital converters 82, 84 provide received analog RF signals into a digital format for application to FPGA 72. In particular, analog to digital converters 82, 84 are implemented intermediate FPGA 72 and RF section 74 for both in-phase (I) and quadrature (Q) communication lines. An additional connection 85 is provided intermediate FPGA 72 and RF section 74. Digital signals output from FPGA 72 via connection 85 are converted to RF signals by RF section 74. Connection 85 can be utilized to transmit phase lock loop (PLL) information, antenna diversity selection information and other necessary communication information. During forward link communications, FPGA 72 is configured to format communication packets received from microcontroller 70 into a proper format for application to RF section 74 for communication.

FPGA 72 is configured to demodulate return link communications received from remote communication devices 12 via RF section 74. FPGA 72 is configured in the described embodiment to perform I and Q combination operations during receive operations. The described FPGA 74 further includes delay and multiplication circuitry to remove the subcarrier. FPGA 74 can also include bit synchronization circuitry and lock detection circuitry. Data, clock and lock detection signals generated within FPGA 74 are applied to microcontroller 70 for processing in the described embodiment.

Microcontroller 70 is configured to control operations of interrogator 26 including outputting of forward link communications and receiving reply link communications. EPROM 78 is configured to store original code and settings selected for the particular application of communication system 10. Flash memory 80 is configured to receive software code updates which may be forwarded to interrogator 26.

RAM device 76 is configured to store data during operations of communication system 10. Such data can include information regarding communications with associated remote communication devices 12 and status information of interrogator 26 during normal modes of operation.

Figure 6:
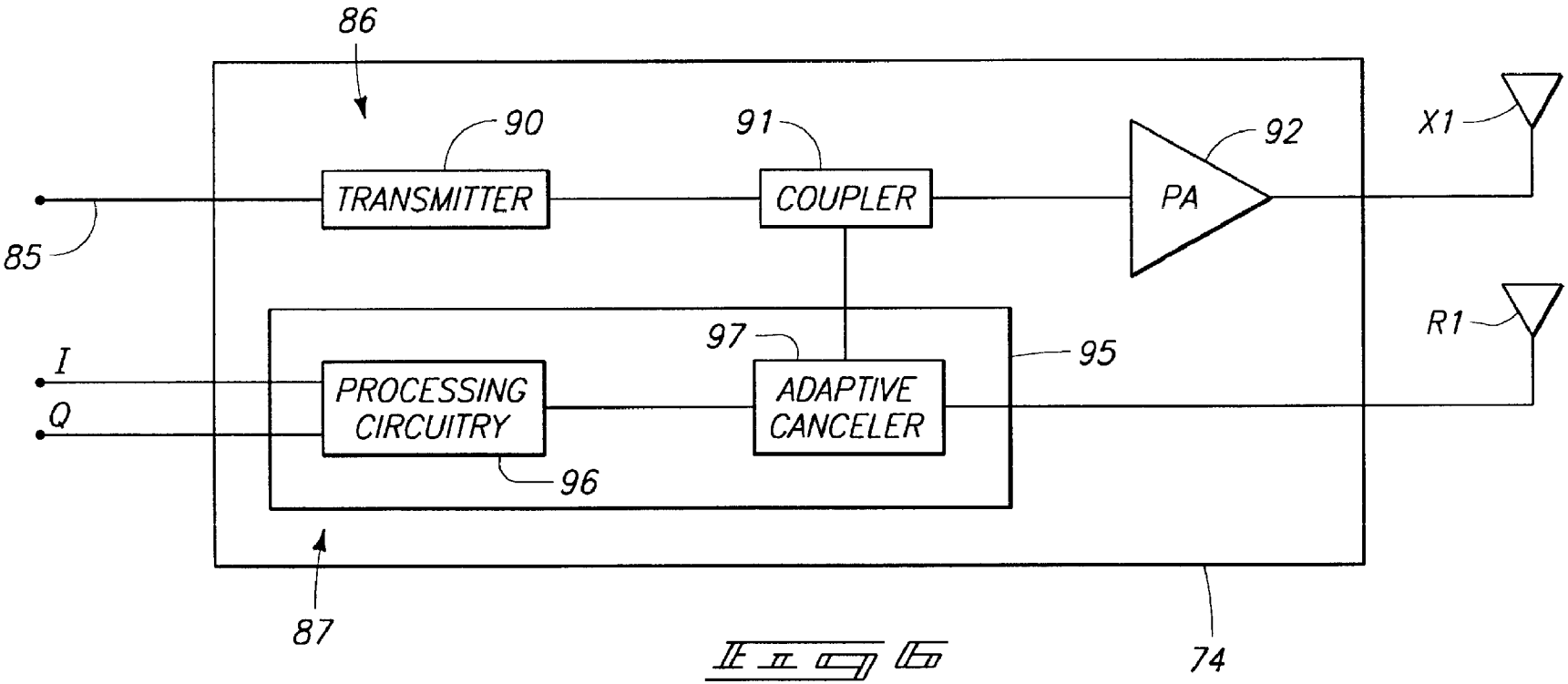
FIG. 6 is a functional block diagram of an RF section of the interrogator.

Referring to FIG. 6, an exemplary embodiment of RF circuitry 74 is illustrated. The depicted RF circuitry 74 includes a transmit path 86 and a receive path 87. In the depicted embodiment, RF section 74 includes a transmitter 90, coupler 91 and power amplifier 92 within transmit data path 86. Receive path 87 includes a receiver 95 comprising processing circuitry 96 and an adaptive canceler 97 in the depicted embodiment.

Communication paths 86, 87 are coupled with respective antennas X1 and R1. Transmit path 86 is additionally coupled with FPGA 72 via connection 85. Receive path 87 is coupled with analog-to-digital converters 82, 84 via the I, and Q connection lines.

During communication operations, transmitter 90 is configured to output a radio frequency wireless forward link communication 27 and a radio frequency wireless continuous wave signal using coupler 91 and antenna X1. Further, transmitter 90 is also configured to output a local continuous wave signal using coupler 91. Transmitter 90 is preferably configured to simultaneously output the wireless continuous wave signal using antenna X1, and the local continuous wave signal using coupler 91. The wireless continuous wave signal transmitted via antenna X1 and the local continuous wave signal provided to receiver 95 via coupler 91 have a common frequency (e.g., 2.44 GHz in the described embodiment).

Receiver 95 is operable to receive the return link communications 29 from at least one remote communication device 12 using antenna R1. As described in detail below, adaptive canceler 97 of receiver 95 is configured to receive the local continuous wave signal from coupler 91. Provision of the local signal provides a coherent backscatter interrogator 26 including a coherent transmitter 90 and receiver 95.

As previously described, return link communication 29 comprises a modulated continuous wave signal in the described embodiment. The modulated signal comprises a carrier signal located at the frequency of the wireless continuous wave signal (e.g., 2.44 GHz), and side bands located at +/−600 kHz about the frequency of the carrier signal. In the described embodiment, receiver 95 is configured to reduce the power or amplitude of the return link communication. More specifically, receiver 95 is configured to reduce the power or amplitude of the carrier signal of the return link communication.

In one embodiment, receiver 95 is operable to reduce the amplitude of the return link communication comprising the modulated continuous wave signal using the local continuous wave signal. More specifically, receiver 95 is configured to reduce the amplitude of the return link communications received by antenna R1 at the common frequency of the continuous wave signals in the described embodiment.

As described in detail below, receiver 95 is configured to receive the local continuous wave signal from coupler 91 and adjust the amplitude and phase of the local continuous wave signal. Such adjustment provides an adjusted continuous wave signal. In particular, the amplitude of the local continuous wave signal is adjusted responsive to the amplitude of the modulated continuous wave signal. Preferably, the amplitude of the local continuous wave signal is adjusted to match the amplitude of the received return link communication. The amplitude of the local continuous wave signal is adjusted before adjustment of the phase of the local continuous wave signal in the described embodiment. Following amplitude and phase adjustment, receiver 95 is configured to sum the adjusted continuous wave signal with the modulated continuous wave signal. Thereafter, the summed return link communication having a reduced amplitude at the frequency of the wireless continuous wave signal is applied to processing circuitry 96.

Referring to FIG. 7, one embodiment of adaptive canceler 97 is illustrated. Adaptive canceler 97 is configured to reduce the amplitude of return link communications 29. More specifically, during backscatter communications, receive path 87 is susceptible to bleed through of the wireless continuous wave signal transmitted via antenna X1. More specifically, the wireless continuous wave signal communicated via transmit antenna X1 can saturate the front end of receiver 95. This leakage can desensitize receiver 95 and reduce the quality of wireless communications of interrogator 26 with remote communication devices 12.

Adaptive canceler 97 utilizes the local continuous wave signal received from transmitter 90 and coupler 91 to reduce the amplitude of the return link communication received by antenna R1 at the frequency of the wireless continuous wave signal transmitted via antenna X1.

As previously described, transmitter 90 is configured to output local and wireless continuous wave signals using coupler 91. Initially, the local continuous wave signal is applied to a variable attenuator 105 within adaptive canceler 97. In the described embodiment, variable attenuator 105 comprises a voltage controlled attenuator. Variable attenuator 105 is configured to adjust the amplitude of the local continuous wave signal responsive to an external control signal discussed below.

Variable attenuator 105 outputs an amplitude adjusted local continuous wave signal. The amplitude adjusted local continuous wave signal is applied to a phase shifter 106. Phase shifter 106 preferably comprises a 360° phase shifter configured to provide an appropriate phase shift of the amplitude adjusted local continuous wave signal. Phase shifter 106 outputs an amplitude and phase adjusted local continuous wave signal which is also referred to as the adjusted continuous wave signal. Phase shifter 106 is controllable via an external control signal described below.

The amplitude and phase adjusted local continuous wave signal output from phase shifter 106 is supplied to a power divider 107. Power divider 107 operates to apply the signal to a detector 108 and coupler 109. Detector 108 is operable to measure the amplitude of the adjusted local signal and apply an output signal to an amplitude adjuster 110.

Return link communication 29 received via antenna R1 is applied to a coupler 114. Coupler 114 applies the received return link communication 29 to coupler 109 and an amplitude detector 115. Detector 115 is configured to measure the amplitude of the received return link communication 29.

Figure 8:
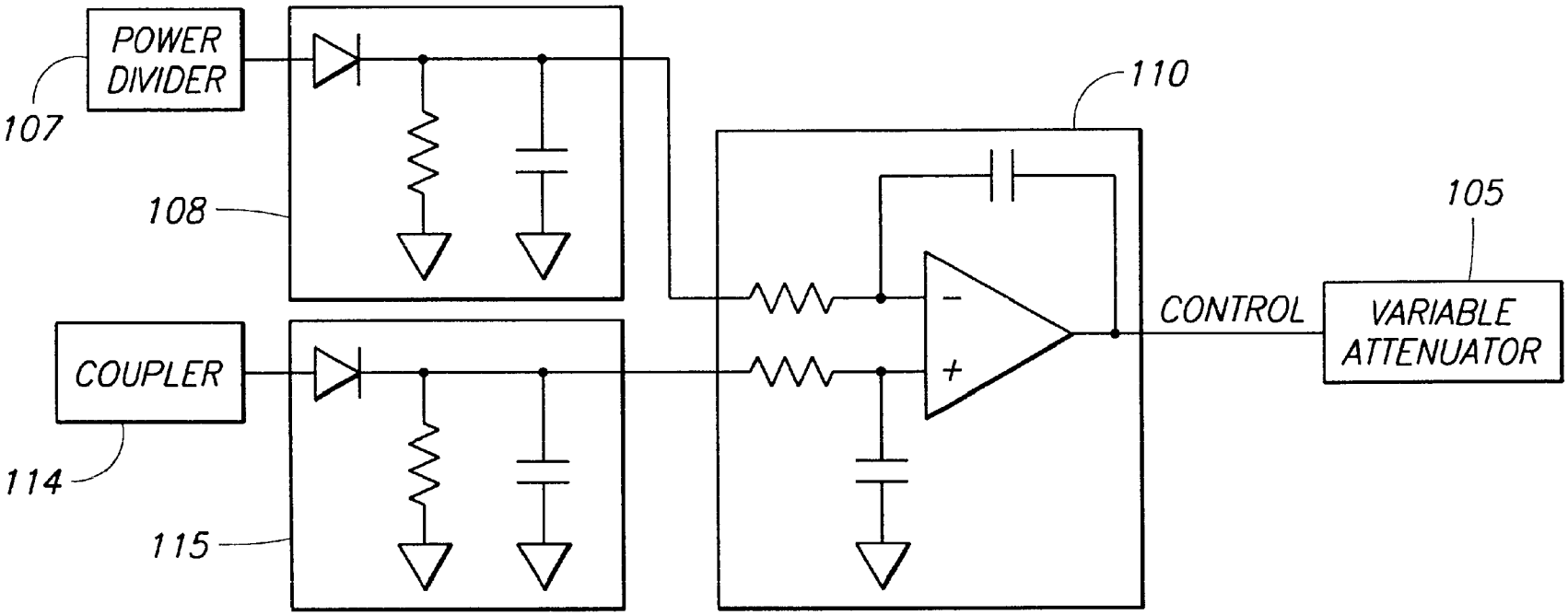
FIG. 8 is a schematic diagram of amplitude detectors and an amplitude adjuster according to one embodiment of the adaptive canceler.

Referring to FIG. 8, exemplary embodiments of amplitude adjuster 110 and detectors 108, 115 are illustrated. Detectors 108, 115 individually comprise discrete components including diodes, resistors and capacitors. Detectors 108, 115 are configured to measure the amplitude of the respective adjusted continuous wave signal and the modulated continuous wave signal.

The measured amplitude values are applied to amplitude adjuster 110 which comprises a feedback amplifier configuration in the depicted embodiment. The illustrated analog implementation of amplitude adjuster 110 is configured to drive variable attenuator 105 to equalize the amplitudes of the adjusted continuous wave signal and the modulated continuous wave signal. Amplitude adjuster 110 is configured to compare the amplitudes of the adjusted continuous wave signal and the received return link communication comprising the modulated continuous wave signal. Thereafter, amplitude adjuster 110 is operable to output a control signal to variable attenuator 105 to match the amplitudes of the respective signals. Other configurations of amplitude adjuster 110 are possible.

Referring again to FIG. 7, coupler 109 is configured to sum the adjusted continuous wave signal and the received modulated continuous wave signal to reduce the amplitude of the modulated continuous wave signal. The summed continuous wave signal or return link communication is applied to a coupler 118. Coupler 118 is configured to apply the summed signal to low noise amplifier (LNA) 119 and amplitude detector 120. Amplitude detector 120 is configured to measure the amplitude of the summed signal and apply an output signal to a phase adjuster 121.

Phase adjuster 121 is controllable responsive to amplitude adjuster 110. Once amplitude adjuster 110 and variable attenuator 105 have matched the amplitudes of the adjusted continuous wave signal and the received return link communication, amplitude adjuster indicates the match to phase adjuster 121 via a connection 122. Thereafter, phase adjuster 121 operates to select an appropriate phase shift of the amplitude adjusted local continuous wave signal.

In the described embodiment, phase adjuster 121 is configured to search across 360° of possible phase adjustments to detect a phase adjustment of the local continuous wave signal which provides maximum reduction of amplitude of the received modulated continuous wave signal at the continuous wave signal frequency. In particular, adaptive canceler 97 adjusts the phase of the local continuous wave signal following matching of amplitudes of the local continuous wave signal and the received modulated continuous wave signal as indicated via connection 122.

Figure 9:
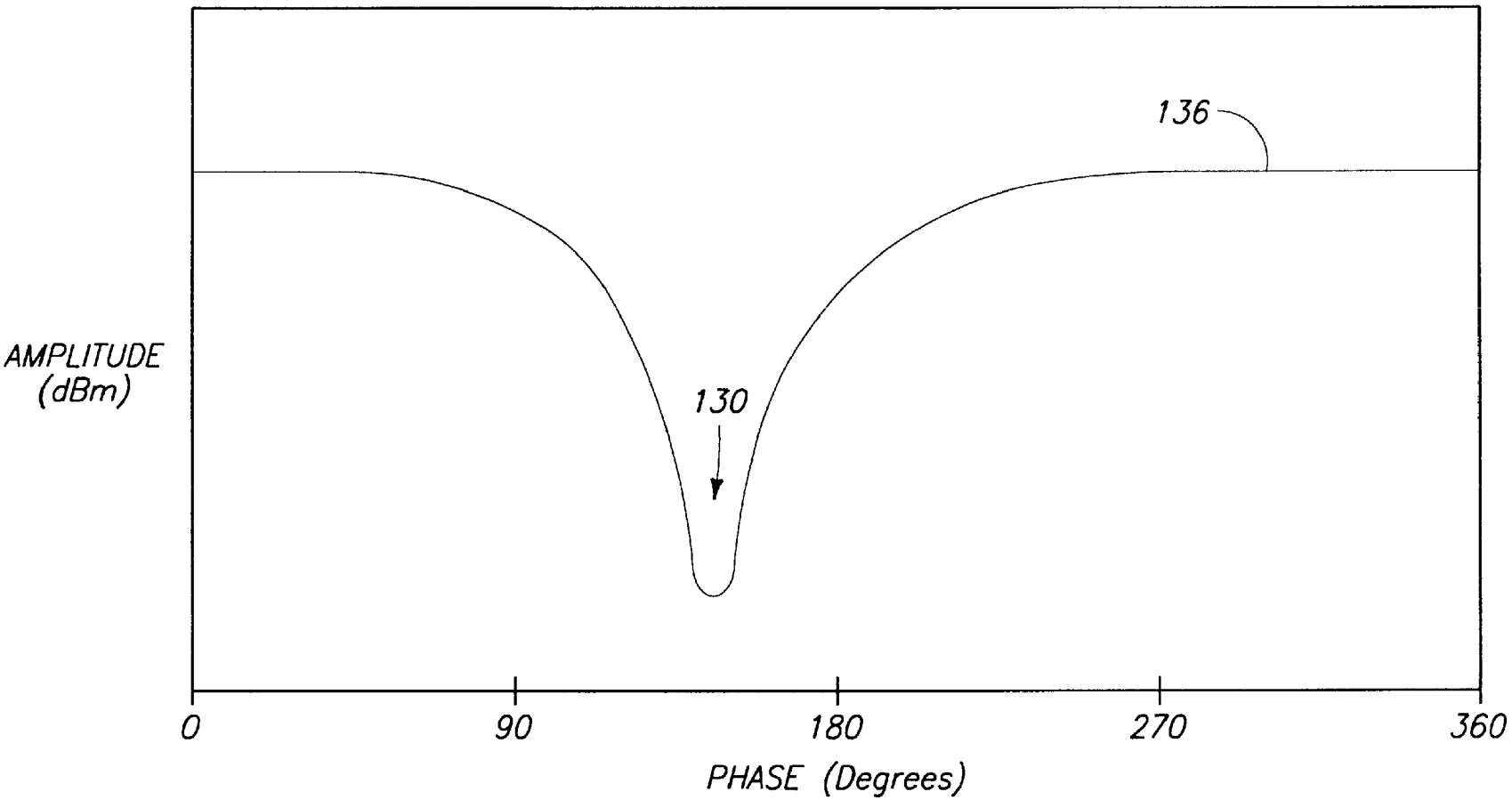
FIG. 9 is a graphical illustration of a summed return link communication output from the adaptive canceler.
Figure 11:
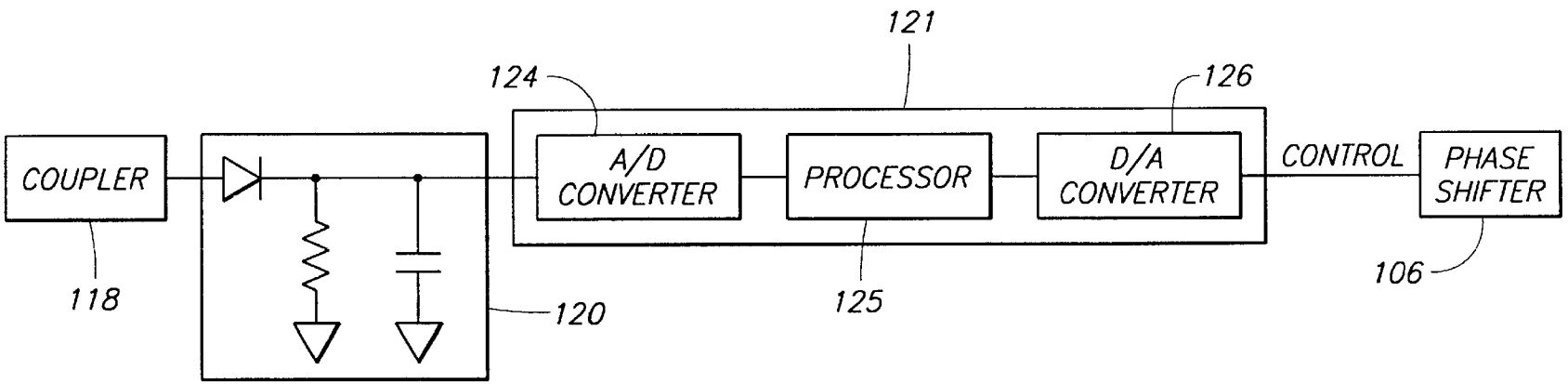

Referring to FIG. 9, a graphical illustration of the amplitude of the summed return link communication, represented by reference numeral 136, is illustrated with respect to corresponding plural phase adjustments of the local continuous wave signal. In the depicted illustration, it is shown that a local minimum value 130 corresponds to approximately 150°. For such a situation following searching of 360°, phase adjuster 121 will apply an appropriate control signal to phase shifter 106 to implement the desired phase shift of approximately 150° to minimize the amplitude of the bleed through of the wireless continuous wave signal within the received return link communication.

Referring again to FIG. 7, the summed return link communication is applied to low noise amplifier 119 and processing circuitry 96. Phase adjuster 121 is operable to continuously monitor the amplitude of the summed return link communication and provide appropriate adjustments using control signals applied to phase shifter 106 to minimize the amplitude of the continuous wave signal within the summed return link communication applied to LNA 119.

Referring to FIG. 10, exemplary embodiments of amplitude detector 120 and phase adjuster 121 are illustrated. Amplitude detector 120 includes discrete components comprising a diode, resistor and capacitor.

Phase adjuster 121 comprises an analog-to-digital converter 124, processor 125 and digital-to-analog converter 126. Processor 125 can be configured to execute appropriate algorithms to implement sequential phase shifts of the local signal from 0° to 360°. The incremental step sizes can be adjusted. Therefore, processor 125 can compare the amplitudes of the summed return link communication signal responsive to various phase adjustments implemented by phase shifter 106. Following selection of an appropriate phase shift, phase adjuster 121 can continue to monitor the amplitude of the summed return link communication and update the phase shift as necessary to maintain maximum reduction of the continuous wave signal within the return link communication during communications. The depicted configurations of detector 120 and phase adjuster 121 are illustrative and other configurations can be utilized.

Referring to FIG. 11 and FIG. 12, the received return link communication applied to adaptive canceler 97 and the summed return link communication output from adaptive canceler 97 are illustrated. The received return link communication comprising the modulated continuous wave signal is illustrated as signal 132 in FIG. 11. The summed return link communication is represented by signal 136 of FIG. 12.

Signal 132 comprises a carrier component 133 and side band components 134. In the described embodiment, carrier 133 is centered at a frequency of 2.44 GHz and subcarrier side band components 134 are depicted at locations +/−600 kHz of the carrier component 133. Signal 136 similarly comprises a carrier component 137 and side band components 138. Signal 136 includes carrier component 137 at a frequency of 2.44 GHz and side band components 138 at locations +/−600 kHz of the carrier component 137.

As illustrated, the output summed return link communication signal 136 has a carrier component 137 having a reduced amplitude compared with the carrier component 133 of the received return link communication signal 132. Preferably, the amplitude of side band components 138 of summed return link communication signal 136 are maintained during the reduction of amplitude of the carrier component 137 as illustrated in FIG. 11 and FIG. 12.

In the depicted illustrations of FIG. 11 and FIG. 12, carrier component 137 of signal 136 is approximately 20 dBm less than carrier component 133 of received return link communication 132. Such indicates the reduction of amplitude of the return link communication signal at the frequency of the wireless continuous wave signal (e.g., 2.44 GHz) utilizing adaptive canceler 97.

Figure 13:
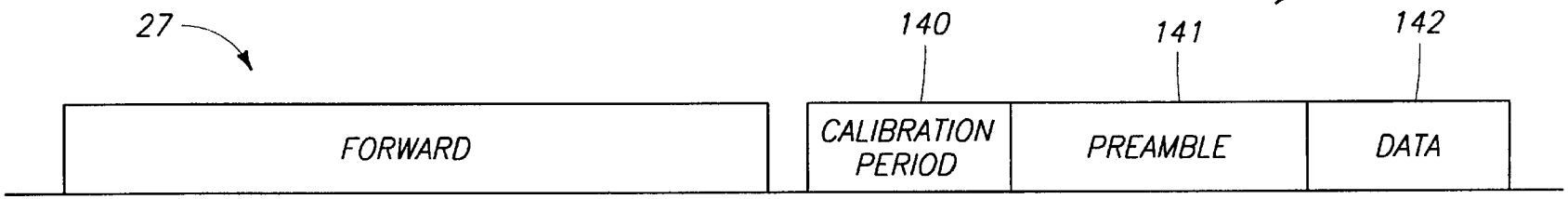
FIG. 13 is a diagrammatic representation of a forward link communication and a return link communication within the communication system.

Referring to FIG. 13, a diagrammatic illustration of forward link communication 27 and return link communication 29 is shown. Initially, forward link communication 27 is communicated using transmit antenna X1 of interrogator 26. Following an intermediate delay or guard band, return link communication 29 corresponding to remote communication device 12 is communicated.

Individual return link communications 29 include a calibration period 140 followed by a preamble 141 and actual data 142. Matching of amplitudes of the local continuous wave signal and the received return link communication and cycling through phases from 0 to 360° utilizing phase adjuster 121 and phase shifter 106 preferably occurs during calibration period 140. The minimum level 130 within the summed return link communication signal is preferably determined during calibration period 140.

Preamble 141 can be utilized to synchronize the processing circuitry 96 of receiver 95 with the actual return link communication 29 being received. Thereafter, data 142 communicated from remote communication device 12 is received.

Adaptive canceler 97 is configured to make adjustments as necessary to the amplitude and phase of the local continuous signal during preamble period 141 and data period 142 to maintain maximum reduction of the continuous wave signal within the received return link communication 29.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed:

[1. A communication system comprising:

a communication device configured to receive a continuous wave signal and to output a modulated continuous wave signal responsive to the receiving; and an interrogator configured to reduce an amplitude of a component of the modulated continuous wave signal having a frequency of the continuous wave signal while substantially maintaining an amplitude of another component of the modulated continuous wave signal having another frequency;

wherein the interrogator is configured to reduce the amplitude of the component prior to demodulation of the modulated continuous wave signal.]

[2. The system of claim 1 wherein the communication device is configured to backscatter modulate the continuous wave signal to output the modulated continuous wave signal.]

[3. The system of claim 1 wherein the communication device comprises a radio frequency identification device.]

[4. The system of claim 1 wherein the interrogator is configured to receive the continuous wave signal and to reduce the amplitude of the component of the modulated continuous wave signal using the continuous wave signal.]

[5. The system of claim 1 wherein the interrogator is configured to receive the continuous wave signal and to reduce the amplitude of the component of the modulated continuous wave signal using the continuous wave signal including adjusting at least one of an amplitude and a phase of the continuous wave signal and combining the adjusted continuous wave signal with the modulated continuous wave signal.]

[6. The system of claim 5 wherein the modulated continuous wave signal comprises a data portion, and wherein the interrogator is configured to adjust the continuous wave signal before reception of the data portion.]

[7. The system of claim 1 wherein the interrogator is configured to receive the continuous wave signal and to reduce the amplitude of the component of the modulated continuous wave signal using the continuous wave signal including matching an amplitude of the continuous wave signal with an amplitude of the modulated continuous wave signal, adjusting a phase of the continuous wave signal, and summing the adjusted continuous wave signal with the modulated continuous wave signal.]

[8. The system of claim 1 wherein the interrogator is configured to reduce the amplitude of the component from one non-zero value to another non-zero value less than the one non-zero value.]

[9. The system of claim 1 wherein the interrogator is configured to reduce the amplitude of the component prior to quadrature demodulation of the modulated continuous wave signal.]

[10. An interrogator comprising:

a receiver configured to receive a continuous wave signal having a frequency and a modulated continuous wave signal, the receiver being further configured to reduce an amplitude of a component of the modulated continuous wave signal having the frequency of the continuous wave signal using the continuous wave signal while substantially maintaining an amplitude of another component of the modulated continuous wave signal having another frequency;

wherein the receiver is configured to reduce the amplitude of the component prior to demodulation of the modulated continuous wave signal.]

[11. The interrogator of claim 10 wherein the receiver is configured to reduce the amplitude of the component of the modulated continuous wave signal using the continuous wave signal including adjusting at least one of an amplitude and a phase of the continuous wave signal and combining the adjusted continuous wave signal with the modulated continuous wave signal.]

[12. The interrogator of claim 11 wherein the modulated continuous wave signal comprises a data portion, and wherein the receiver is configured to adjust the continuous wave signal before reception of the data portion.]

[13. The interrogator of claim 10 wherein the receiver is configured to reduce the amplitude of the component of the modulated continuous wave signal using the continuous wave signal including matching an amplitude of the continuous wave signal with the amplitude of the modulated continuous wave signal, adjusting a phase of the continuous wave signal, and summing the adjusted continuous wave signal with the modulated continuous wave signal.]

[14. The interrogator of claim 10 wherein the receiver is configured to reduce the amplitude of the component from one non-zero value to another non-zero value less than the one non-zero value.]

[15. The interrogator of claim 10 wherein the receiver is configured to reduce the amplitude of the component prior to quadrature demodulation of the modulated continuous wave signal.]

[16. An interrogator comprising:

a receiver configured to receive a local signal and a communication signal, the receiver being further configured to adjust the local signal responsive to the communication signal and to reduce an amplitude of a component of the communication signal having a first frequency using the adjusted local signal while substantially maintaining an amplitude of another component of the communication signal having another frequency.]

[17. The interrogator of claim 16 wherein the local signal comprises a continuous wave signal and the communication signal comprises a modulated continuous wave signal.]

[18. The interrogator of claim 16 wherein the receiver is configured to adjust the local signal including adjusting at least one of an amplitude and a phase of the local signal and to combine the adjusted local signal and the communication signal to reduce the amplitude of the component of the communication signal having the first frequency.]

[19. The interrogator of claim 16 wherein the receiver is configured to adjust the local signal including matching an amplitude of the local signal with an amplitude of the modulated continuous wave signal and adjusting a phase of the local signal.]

[20. The interrogator of claim 19 wherein the receiver is configured to sum the adjusted local signal with the communication signal to reduce the amplitude of the component of the communication signal having the first frequency.]

[21. The interrogator of claim 16 wherein the communication signal comprises a data portion and the receiver is configured to adjust the local signal before reception of the data portion.]

[22. The interrogator of claim 16 wherein the receiver is configured to reduce the amplitude of the component from one non-zero value to another non-zero value less than the one non-zero value.]

[23. The interrogator of claim 16 wherein the receiver is configured to reduce the amplitude of the component prior to demodulation of the modulated continuous wave signal.]

[24. A communication method comprising:

communicating a continuous wave signal having a frequency;

communicating a modulated continuous wave signal responsive to the continuous wave signal using a communication device;

receiving the modulated continuous wave signal; and reducing an amplitude of a component of the modulated continuous wave signal having the frequency of the continuous wave signal after the receiving while substantially maintaining an amplitude of a component of the modulated continuous wave signal having a frequency different than the frequency of the continuous wave signal;

wherein the reducing comprises reducing prior to demodulation of the modulated continuous wave signal.]

[25. The method of claim 24 wherein the communicating the modulated continuous wave signal comprises backscatter modulating the continuous wave signal.]

[26. The method of claim 24 wherein the communicating comprises communicating using the communication device comprising a radio frequency identification device.]

[27. The method of claim 24 further comprising providing a local continuous wave signal and the reducing comprises reducing using the local continuous wave signal.]

[28. The method of claim 24 further comprising providing a local continuous wave signal and the reducing comprises reducing using the local continuous wave signal including adjusting at least one of an amplitude and a phase of the local continuous wave signal and combining the adjusted local continuous wave signal and the modulated continuous wave signal.]

[29. The method of claim 28 wherein the modulated continuous wave signal comprises a data portion, and the adjusting comprises adjusting before receiving the data portion.]

[30. The method of claim 24 further comprising providing a local continuous wave signal and the reducing comprises reducing using the local continuous wave signal including matching an amplitude of the local continuous wave signal with an amplitude of the modulated continuous wave signal, adjusting a phase of the local continuous wave signal, and summing the adjusted local continuous wave signal with the modulated continuous wave signal.]

[31. The method of claim 24 wherein the reducing comprises reducing the amplitude of the component from one non-zero value to another non-zero value less than the one non-zero value.]

[32. The method of claim 24 wherein the reducing comprises reducing prior to demodulation of the modulated continuous wave signal.]

[33. The method of claim 24 wherein the communicating the continuous wave signal, the receiving and the reducing comprise using an interrogator.]

[34. A communication method comprising:

providing a continuous wave signal;

modulating the continuous wave signal providing a modulated continuous wave signal to communicate information;

receiving the modulated continuous wave signal; and after the receiving, reducing an amplitude of a component of the modulated continuous wave signal having a frequency of the continuous wave signal while substantially maintaining an amplitude of another component of the modulated continuous wave signal having another frequency;

wherein the reducing comprises reducing prior to demodulation of the modulated continuous wave signal.]

[35. The method of claim 34 wherein the modulating comprises backscatter modulating.]

[36. The method of claim 34 wherein the modulating comprises modulating using a radio frequency identification device.]

[37. The method of claim 34 wherein the reducing comprises adjusting at least one of an amplitude and a phase of the continuous wave signal and combining the adjusted continuous wave signal and the modulated continuous wave signal.]

[38. The method of claim 37 wherein the modulated continuous wave signal comprises a data portion and the adjusting comprises adjusting before receiving the data portion.]

[39. The method of claim 34 wherein the reducing comprises matching an amplitude of the continuous wave signal with an amplitude of the modulated continuous wave signal, adjusting a phase of the continuous wave signal, and summing the continuous wave signal and the modulated continuous wave signal after the matching and the adjusting.]

[40. The method of claim 34 wherein the reducing comprises reducing the amplitude of the component from one non-zero value to another non-zero value less than the one non-zero value.]

[41. The method of claim 34 wherein the reducing comprises reducing prior to quadrature demodulation of the modulated continuous wave signal.]

[42. The method of claim 34 wherein the providing, the receiving, and the reducing comprise using an interrogator and the modulating comprises using a communication device.]

[43. A communication method comprising:

providing a local signal;

receiving a communication signal; and after the receiving, reducing an amplitude of a first component of the communication signal while substantially maintaining an amplitude of a second component of the communication signal, the reducing comprising adjusting the local signal responsive to the communication signal and combining the communication signal and the local signal after the adjusting.]

[44. The method of claim 43 wherein the providing comprises communicating the local signal comprising a continuous wave signal, and further comprising communicating the communication signal comprising a modulated continuous wave signal.]

[45. The method of claim 43 further comprising communicating the communication signal using a radio frequency identification device.]

[46. The method of claim 43 wherein the reducing comprises adjusting at least one of an amplitude and a phase of the local signal and combining the local signal and the communication signal after the adjusting.]

[47. The method of claim 46 wherein the communication signal comprises a data portion and the adjusting comprises adjusting before receiving the data portion.]

[48. The method of claim 43 wherein the reducing comprises matching an amplitude of the local signal with an amplitude of the communication signal, adjusting a phase of the local signal, and summing the local signal and the communication signal after the matching and the adjusting.]

[49. The method of claim 43 wherein the reducing comprises reducing the amplitude of the first component from one non-zero value to another non-zero value less than the one non-zero value.]

[50. The method of claim 43 wherein the reducing comprises reducing prior to demodulation of the modulated continuous wave signal.]

[51. The method of claim 43 wherein the providing, the receiving, and the reducing comprise using an interrogator, and further comprising communicating the communication signal using a communication device.]

[52. A coherent backscatter system communication method comprising:

reducing an amplitude of a frequency component of a modulated continuous wave signal using a receiver, the reducing including:

adjusting an amplitude and a phase of a local continuous wave signal providing an adjusted continuous wave signal; and summing the adjusted continuous wave signal with the modulated continuous wave signal.]

[53. A communication system comprising:

a communication device configured to receive a continuous wave signal and to output a modulated continuous wave signal responsive to the receiving; and an interrogator configured to reduce an amplitude of a component of the modulated continuous wave signal having a frequency of the continuous wave signal while substantially maintaining an amplitude of another component of the modulated continuous wave signal having another frequency;

wherein the interrogator is configured to receive the continuous wave signal and to reduce the amplitude of the component of the modulated continuous wave signal using the continuous wave signal including matching an amplitude of the continuous wave signal with an amplitude of the modulated continuous wave signal, adjusting a phase of the continuous wave signal, and summing the adjusted continuous wave signal with the modulated continuous wave signal.]

[54. An interrogator comprising:

a receiver configured to receive a continuous wave signal having a frequency and a modulated continuous wave signal, the receiver being further configured to reduce an amplitude of a component of the modulated continuous wave signal having the frequency of the continuous wave signal using the continuous wave signal while substantially maintaining an amplitude of another component of the modulated continuous wave signal having another frequency;

wherein the receiver is configured to reduce the amplitude of the component of the modulated continuous wave signal using the continuous wave signal including matching an amplitude of the continuous wave signal with the amplitude of the modulated continuous wave signal, adjusting a phase of the continuous wave signal, and summing the adjusted continuous wave signal with the modulated continuous wave signal.]

[55. A communication method comprising:

communicating a continuous wave signal having a frequency;

communicating a modulated continuous wave signal responsive to the continuous wave signal using a communication device;

receiving the modulated continuous wave signal;

reducing an amplitude of a component of the modulated continuous wave signal having the frequency of the continuous wave signal after the receiving while substantially maintaining an amplitude of a component of the modulated continuous wave signal having a frequency different than the frequency of the continuous wave signal; and providing a local continuous wave signal and the reducing comprises reducing using the local continuous wave signal including matching an amplitude of the local continuous wave signal with an amplitude of the modulated continuous wave signal, adjusting a phase of the local continuous wave signal, and summing the adjusted local continuous wave signal with the modulated continuous wave signal.]

[56. A communication method comprising:

providing a continuous wave signal;

modulating the continuous wave signal providing a modulated continuous wave signal to communicate information;

receiving the modulated continuous wave signal; and after the receiving, reducing an amplitude of a component of the modulated continuous wave signal having a frequency of the continuous wave signal while substantially maintaining an amplitude of another component of the modulated continuous wave signal having another frequency;

wherein the reducing comprises matching an amplitude of the continuous wave signal with an amplitude of the modulated continuous wave signal, adjusting a phase of the continuous wave signal, and summing the continuous wave signal and the modulated continuous wave signal after the matching and the adjusting.]

*57. A method comprising:*

*interrogating a radio frequency identification (RFID) tag using an interrogator to transmit a wireless spread spectrum signal comprising a wireless command signal followed by a wireless continuous wave signal, the interrogator further generating a local continuous wave signal having a common frequency with the wireless continuous wave signal;*

*receiving a return signal using the interrogator, the return signal comprising a carrier component and a side band component, the side band component including information from the RFID tag sent in response to the command using backscatter communication;*

*adjusting the local continuous wave signal to generate an adjusted local continuous wave signal; and*

*reducing an amplitude of the carrier component using the adjusted local continuous wave signal and substantially maintaining an amplitude of the side band component, wherein reducing the amplitude of the carrier component comprises summing the return signal with the adjusted local continuous wave signal.*

*58. The method of claim 57, wherein adjusting the local continuous wave signal comprises adjusting an amplitude and a phase of the local continuous wave signal.*

*59. The method of claim 57, wherein the interrogator is configured to communicate in accordance with a selected one of a plurality of RFID communication applications.*

*60. The method of claim 57, wherein the wireless command signal includes a calibration period, a preamble, a start code, and error detection data.*

*61. The method of claim 60, wherein the information from the RFID tag includes an identification number associated with the RFID tag and error detection data.*

*62. A system comprising:*

*an RFID tag comprising a half wavelength dipole antenna, the RFID tag configured to receive a wireless spread spectrum signal comprising a wireless command signal followed by a wireless continuous wave signal, and to backscatter reply information onto the wireless continuous wave signal in response to the command signal; and*

*an interrogator comprising:*

*a transmitter to transmit the wireless spread spectrum signal;*

*a first coupler to provide a local continuous wave signal having a common frequency with the wireless continuous wave signal;*

*a receiver to receive a return signal comprising a carrier component and a side band component, the side band component including the reply information from the RFID tag; and*

*circuitry to adjust the local continuous wave signal to generate an adjusted local continuous wave signal, and to reduce an amplitude of the carrier component of the return signal using the adjusted local continuous wave signal while substantially maintaining an amplitude of the side band component, wherein the circuitry comprises a second coupler to sum the return signal with the adjusted local continuous wave signal.*

*63. The system of claim 62, wherein the circuitry comprises an amplitude adjuster to adjust an amplitude of the local continuous wave signal, and a phase shifter to shift a phase of the local continuous wave signal.*

*64. The system of claim 62, wherein the interrogator comprises memory and a microcontroller configured to communicate in accordance with a selected one of a plurality of RFID communication applications.*

* * * * *